United States Patent [19]

Morita

[11] Patent Number: 5,168,565
[45] Date of Patent: Dec. 1, 1992

[54] DOCUMENT RETRIEVAL SYSTEM

[75] Inventor: Tetsuya Morita, Yokohama, Japan

[73] Assignee: Ricoh Company, Ltd., Japan

[21] Appl. No.: 296,769

[22] Filed: Jan. 13, 1989

[30] Foreign Application Priority Data

Jan. 20, 1988 [JP] Japan .................................. 63-8291
Jul. 27, 1988 [JP] Japan .............................. 63-185462

[51] Int. Cl.⁵ .......................................... G06F 15/40
[52] U.S. Cl. ............................. 395/600; 364/DIG. 1;
364/225.4; 364/963.34; 364/963.3; 364/963
[58] Field of Search ... 364/200 MS File, 900 MS File; 395/600

[56] References Cited

U.S. PATENT DOCUMENTS

| | | | |
|---|---|---|---|
| 4,358,824 | 11/1982 | Glickman et al. | 364/200 |
| 4,542,477 | 9/1985 | Noyori et al. | 364/900 |
| 4,554,631 | 11/1985 | Reddington | 364/300 |
| 4,803,642 | 2/1988 | Muranaga | 364/513 |
| 4,805,099 | 2/1989 | Huber | 364/300 |
| 4,823,306 | 4/1989 | Barbic et al. | 364/900 |
| 4,849,898 | 7/1989 | Adi | 364/419 |
| 4,868,733 | 9/1989 | Fujisawa et al. | 364/200 |
| 4,965,763 | 10/1990 | Zamora | 364/900 |
| 5,020,019 | 5/1991 | Ogawa | 364/900 |

FOREIGN PATENT DOCUMENTS 0032194 7/1981 European Pat. Off.

OTHER PUBLICATIONS

Ronald A. Fisher, "Statistical Method For Research Workers", Oliver & Voyd Limited Publ., 1925, pp.62-89 (English Translation from pp. 67-73).
Teruhisa Miyake et al., "Generation of Descriptor Relations of a Database Based on Fuzzy Sets and Application to Information Retrieval," 4th FUZZY System Symposium (Tokyo, May 30, 1988).
Kousuke Takahashi et al., "String Matching Hardware Architecture," *Denshi Tsushin Gakkai Kenkyo Hokoku*, CPSY 86-57, Jul. 1986, pp. 57-68.
Atsushi Tamura et al., "An Automatic Document Classification Method Based on the Keyword Frequency Analysis," *Information Processing of Japan*, 36th National Convention's Papers, 1988, 1st Term, pp. 1305 and 1306.
Hayashi, "Quantitative Method," *Tokyo Keizai Shinbunsha*, 1974, pp. 27-16.
Miyamoto et al., "Generation of a Pseudothesaurus for Information Retrieval Based on Coocurrences and Fuzzy Set Operations", IEEE Transactions on Systems, Man, and Cybernetics, vol. SMC-13, No. 1, Jan./Feb. 1983.

*Primary Examiner*—Gareth D. Shaw
*Assistant Examiner*—Maria N. Von Buhr
*Attorney, Agent, or Firm*—Mason, Fenwick & Lawrence

[57] ABSTRACT

A document retrieval system employs a keyword connection table which contains relation information of keyword connections respectively coupling two arbitrary keywords which are used for retrieving registered documents. The relation information at least includes a relation name and a relationship describing the relation between the two arbitrary keywords. The relation information may dynamically change depending on a frequency of use of the keywords, that is, by a learning function.

9 Claims, 14 Drawing Sheets

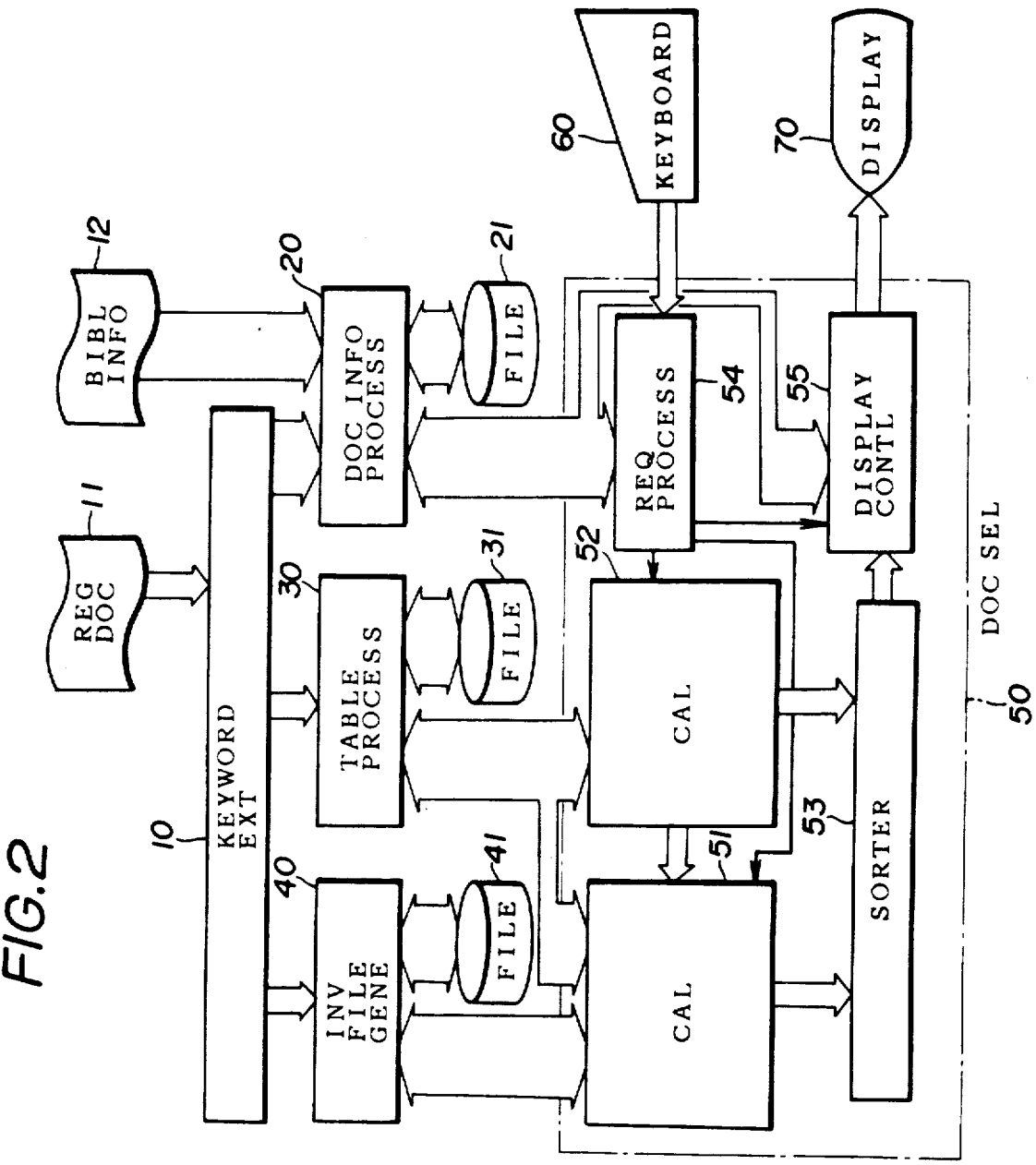

FIG.3A

Company R has developed a LAN (communication
network within enterprise) system analogous to
nerve cells of a human and has hopes of reducing
it to practice.
The unique designing method connects a plurality
of nodes (relay computers).
The entire network will not fail even when a
portion of the cable breaks, and the system can be
expanded successively depending on the scale.
In addition, it has such features like the
transmission of an image such as a color
photograph at a speed approximately ten times the
conventional speed.
It is noticed as a new design concept of the LAN.

FIG.3B

Document Number:123
Date:September29, 1986
Title:"Company R Develops New LAN"
Sub Title:"Instantaneous Transmission of Image"
Author:ABC DEF
Source:Newspaper N
Pages:13

FIG.3C

Company R, Nerve Cell, LAN, System, Develop,
Reduce to Practice, Node, Relay, Computer,
Designing Method, Cable, Network, Color
Photograph, Image, Transmission, Speed

FIG.5

| $KW_1$ (COMPANY R) | | | | | | |
|---|---|---|---|---|---|---|
| "TECHNICAL TIE-UP" 50 | $KW_2$ (BTT) | | | | | |
| "R&D" 30 | "R&D" 40 | $KW_3$ (COMMUNI- CATION) | | | | |
| *** | *** | "SYNONYM" 20 | $KW_4$ (NERVE CELL) | | | |
| *** | *** | *** | "ALSO KNOWN AS" 70 | | | |
| "IS-A" 90 | "IS-A" 50 | *** | *** | | $KW_{M-1}$ (ENTER- PRISE) | |
| 0 | *** | *** | *** | | *** | $KW_M$ (IMAGE) |
| 0 | 0 | 0 | 0 | | 0 | 0 |

FIG.6

| | KW1 (COMPANY R) | KW2 (BTT) | KW3 (COMMUNI-CATION) | KW4 (NERVE CELL) | KWM-1 (ENTER-PRISE) | KWM (IMAGE) |
|---|---|---|---|---|---|---|
| KW2 (BTT) | "TECHNICAL TIE-UP" 50 | | | | | |
| KW3 (COMMUNI-CATION) | "R&D" 30 | "R&D" 40 | | | | |
| KW4 (NERVE CELL) | "INCLUDING SAME TEXT" 80 | *** | "SYNONYM" 20 | | | |
| | *** | *** | *** | "ALSO KNOWN AS" 70 | | |
| | "IS-A" 90 | "IS-A" 50 | *** | *** | 0 | |
| KWM (IMAGE) | "INCLUDING SAME TEXT" 80 | *** | *** | "INCLUDING SAME TEXT" 80 | 0 | |

FIG. 7

| KW₁ (COMPANY R) | | | | | |
|---|---|---|---|---|---|
| "TECHNICAL TIP-UP" 50 | KW₂ (BTT) | | | | |
| "R&D" 30 | "R&D" 40 | KW₃ (COMMUNI-CATION) | | | |
| "INCLUDING SAME TEXT" 80 | "INDIRECT" 30.8 | "SYNONYM" 20 | KW₄ (NERVE CELL) | | |
| *** | *** | *** | "ALSO KNOWN AS" 70 | | |
| "IS-A" 90 | "IS-A" 50 | 0 | "INDIRECT" 42.4 | KWₘ₋₁ (ENTER-PRISE) | |
| "INCLUDING SAME TEXT" 80 | "INDIRECT" 30.8 | "INDIRECT" 22.5 | "INDIRECT" 21.8 | "INDIRECT" 42.4 | KWₘ (IMAGE) |

FIG. 8

| KW₁ (COMPANY R) | | | | | |
|---|---|---|---|---|---|
| "TECHNICAL TIE-UP" 55 | KW₂ (BTT) | | | | |
| "R&D" 40 | "R&D" 45 | KW₃ (COMMUNI-CATION) | | | |
| "INCLUDING SAME TEXT" 90 | "INDIRECT" 35.8 | "SYNONYM" 30 | KW₄ (NERVE CELL) | | |
| *** 0 | *** 0 | *** 0 | "ALSO KNOWN AS" 75 | | |
| "IS-A" 95 | "IS-A" 50 | "INDIRECT" 27.5 | "INDIRECT" 47.4 | KW_{M-1} (ENTER-PRISE) | |
| "INCLUDING SAME TEXT" 90 | "INDIRECT" 35.8 | "INDIRECT" 31.8 | "INCLUDING SAME TEXT" 90 | "INDIRECT" 47.4 | KW_M (IMAGE) |

| CASE (I) | | CASE (II) | CASE (III) | | |
|---|---|---|---|---|---|
| [1-2] | [6-7] | [1-3] | [1-6] | [2-8] | [4-6] |
| [1-4] | [6-8] | [1-5] | [1-7] | [2-9] | [4-7] |
| [2-3] | [7-8] | [2-5] | [1-8] | [3-6] | . |
| [2-4] | [7-9] | [3-4] | [1-9] | [3-7] | . |
| [3-5] | [8-9] | [6-9] | [2-6] | [3-8] | [5-8] |
| [4-5] | | | [2-7] | [3-9] | [5-9] |

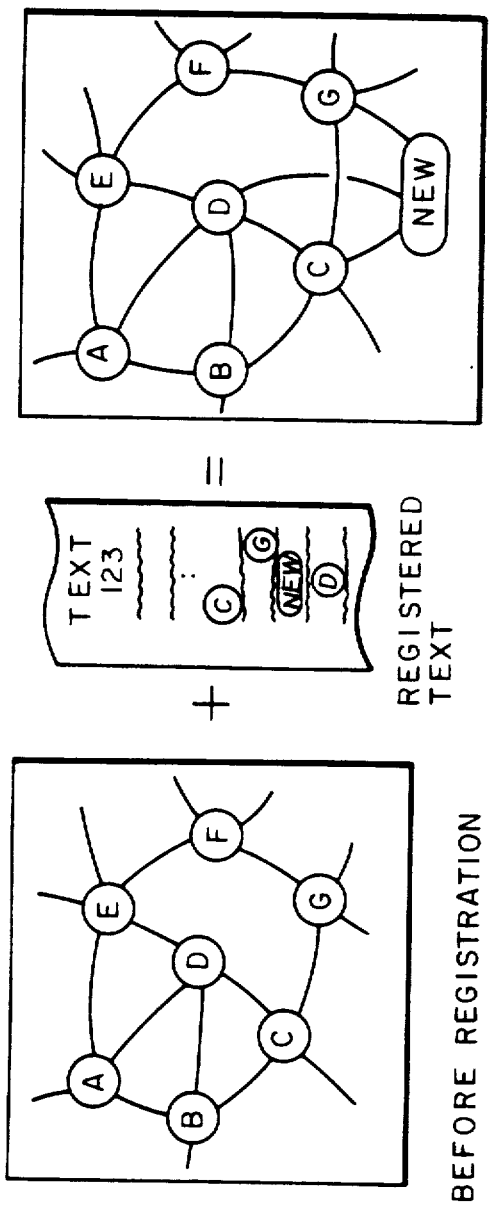
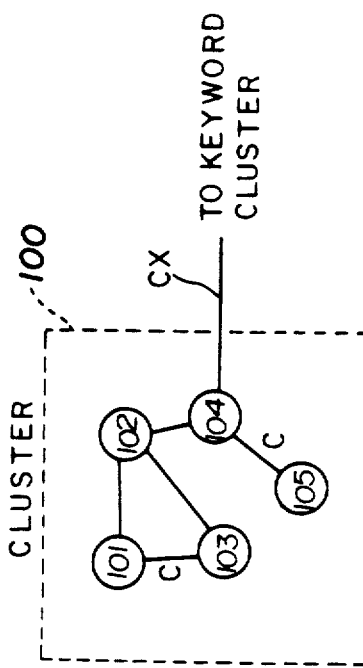
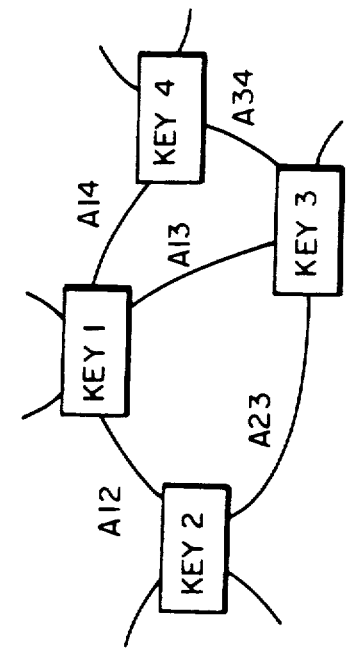
FIG. 17
FIG. 18
FIG. 16

DOCUMENT RETRIEVAL SYSTEM

BACKGROUND OF THE INVENTION

The present invention generally relates to document retrieval systems, and more particularly to a document retrieval system which can generate a group of keywords which are close to the vocabulary or image of the user at a high speed and with a high flexibility.

Conventional document retrieval systems can generally be categorized into two kinds depending on the different registration and retrieval methods. The two kinds are the thesaurus type and the free keyword type.

According to the thesaurus type document retrieval system, the operator at the time of the document registration selects those keywords which are assumed to be appropriate and registers the selected keywords together with the bibliographical matters. At the time of the document retrieval the user designates the keywords which are assumed to be appropriate out of the thesaurus (group of keywords) for use in retrieving the document.

On the other hand, according to the free keyword type document retrieval system, the operator at the time of the document registration registers only the bibliographical matters and the document content. At the time of the document retrieval, the user designates the free keywords to retrieve the document.

The thesaurus type document retrieval system may have an inverted file and it is possible to make a high speed document retrieval. However, there is a problem in that a large memory capacity is required to store the keywords. In addition, the keywords selected by the operator at the time of the document registration may not necessarily be appropriate, and there is a problem in that the appropriateness of the selected keywords determines the performance of the system. Furthermore, there are problems in that the indexing (classification) and renewal of the keywords using the thesaurus are both complex and not necessarily appropriate.

On the other hand, the free keyword type document retrieval system need only have a small memory capacity to store the keywords. Moreover, the existence or non-existence of a document including the designated keyword is clear, and the classification (indexing) of the keywords is unnecessary. But there are problems in that the retrieval time is long because the entire document is referred to by use of the designated keyword, and the system is not suited for making a fuzzy retrieval such as processing synonyms.

SUMMARY OF THE INVENTION

Accordingly, it is a general object of the present invention to provide a novel and useful document retrieval system in which the problems described above are eliminated.

Another and more specific object of the present invention is to provide a document retrieval system for retrieving one or a plurality of registered documents from a document database responsive to designated retrieval conditions including one or a plurality of designated keywords, comprising extracting means for extracting keywords from each of documents when registering the documents, inverted file means supplied with the documents and extracted keywords from the extracting means for generating an inverted file which indicates a relation between the extracted keywords and each of the documents, table generating means supplied with the extracted keywords for generating a keyword connection table containing a relation information which describes a keyword connection which couples two arbitrary keywords for all of the extracted keywords, storage means for storing the inverted file, the keyword connection table, and the extracted keywords and the documents as registered documents in a form of a document database, designating means for designating retrieval conditions including one or a plurality of designated keywords, where the retrieval conditions determine one or a plurality of the registered documents to be retrieved from the storage means, selecting means for looking up the keyword connection table by use of the one or plurality of designated keywords and referring to the inverted file so as to select the one or plurality of registered documents which satisfy the retrieval conditions, and output means for outputting the one or plurality of registered documents selected by the selecting means. According to the document retrieval system of the present invention, there is no need to make the classification (or indexing) of the keywords, and it is possible to make the document retrieval at a high speed with a vocabulary or image close to that of the user.

Still another object of the present invention is to provide a document retrieval system of the above described type wherein the relation information contained in the keyword connection table dynamically changes depending on a frequency of use of the keywords. According to the document retrieval system of the present invention, the relation information contained in the keyword connection table changes by a learning function and the system is unaffected by the vocabulary or image of the operator who initially sets the relation information after the system is in use for a predetermined time.

Other objects and further features of the present invention will be apparent from the following detailed description when read in conjunction with the accompanying drawings.

BRIEF DESCRIPTION OF THE DRAWINGS

FIG. 2 is a system block diagram showing an embodiment of the document retrieval system according to the present invention;

FIGS. 3A, 3B and 3C respectively show a document to be registered, bibliographical information thereof and keywords thereof;

FIG. 5 shows a keyword connection table before registration of the document shown in FIG. 3A;

FIG. 6 shows a keyword connection table after the registration of the document shown in FIG. 3A;

FIG. 7 shows a keyword connection table obtained by adding values to relationship values in the keyword connection table shown in FIG. 6 depending on a group of selected keywords;

FIG. 8 shows a keyword connection table obtained from the keyword connection table shown in FIG. 6 and including indirect connections and its relationship values;

FIG. 16 shows an embodiment of a network model of the keyword connections;

FIG. 17 is a diagram for explaining transitions of the network model before and after the document registration; and FIG. 18 is a diagram showing an embodiment of clusterized keywords.

DETAILED DESCRIPTION

Figure 1:
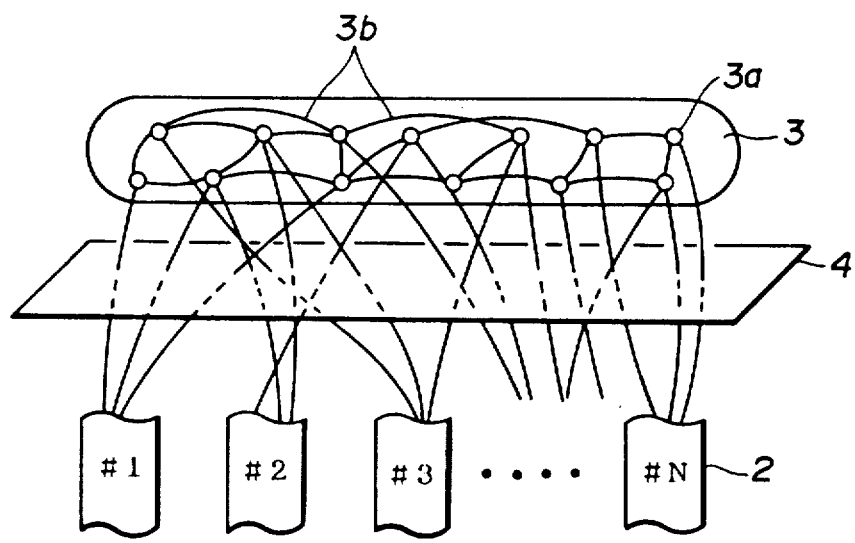
FIG. 1 is a diagram for explaining the operating principle of a document retrieval system according to the present invention.

First, a description will be generally given of the operating principle of the document retrieval system according to the present invention. FIG. 1 shows a keyword layer and a document database. The present invention uses a new concept referred hereunder as a "dynamic keyword connection".

As shown in FIG. 1, each of documents #1, #2, ..., #N within a document database 2 are made to correspond with keywords $3a$ included in the documents #1, #2, ..., #N by an inverted file 4. A keyword layer 3 is made up of the keywords $3a$, and keyword connections $3b$ which are respectively constituted by a relation information between two keywords $3a$ which are coupled by the keyword connection $3b$. The relation information includes a relation name, value of relationship, relation direction (sign) and the like. For example, the relation name includes "also known as", "synonym", "including same text", "IS-A relation", "IS-PART-OF relation" and the like. The value of the relationship (hereinafter also referred to as a relationship value) and the relation direction respectively indicate the amplitude and direction of the relation, and the value and direction change when the user makes a keyword access. Because the relationship value and the relation direction change depending on the frequency of use (or access frequency), record and the like, the keyword layer 3 as a whole gradually approaches the vocabulary or image of the user depending on the frequently used keywords $3a$ and the manner in which the keywords $3a$ are used. In other words, a dynamic keyword connection is gradually formed.

Generally, a maximum number of keyword connections coupling N keywords is $(N^2-N)/2$.

In the present specification, the relation name "also known as" refers to keywords which are spelled differently but mean the same thing, such as "optical character reader" and "OCR. In addition, the relation name "synonym" refers to keywords which mean similar things, such as "close" and "near". Further, the relation direction refers to the direction in which two relation names are related when the two relation names are related by a IS-PART-OF relation, for example.

A relationship between two arbitrary keywords $3a$ can be defined by use of the information on the relationship name and relationship value of the keyword connection (direct keyword connection) $3b$ which actually exists in the keyword layer 3. In addition, a "relevance of keyword" which indicates the amplitude of the relation between the group of keywords designated by the user and each of the keywords registered in the document retrieval system and a "relevance of text" which indicates the amplitude of the relation between the group of keywords designated by the user and each of texts registered in the document retrieval system can respectively be defined as a function of the relationship referred above. When the relationship between two arbitrary keywords $3a$, the relevance of keywords and the relevance of text are obtained, the user can refine the group of keywords appropriately for the subject by the interaction between the user and the document retrieval system when selecting the group of keywords appropriate for the document which is to be retrieved.

Figure 4:
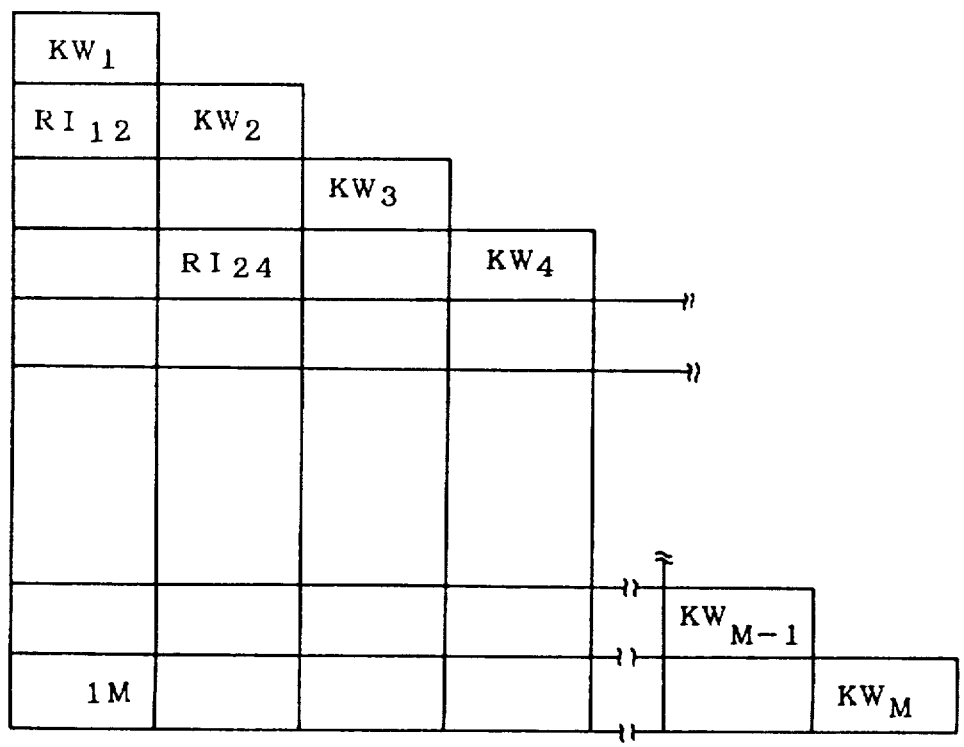
FIG. 4 shows an embodiment of a keyword connection table.

The dynamic keyword connection can be managed by a keyword connection table shown in FIG. 4. In FIG. 4, there are M keywords $KW_1$ through $KW_M$ in the keyword connection table, and for example, $RI_{12}$ denotes the relation information between the keywords $KW_1$ and $KW_2$ and $RI_{1M}$ denotes the relation information between the keywords $KW_1$ and $KW_M$.

Next, a description will be given of an embodiment of the document retrieval system according to the present invention, by referring to FIG. 2. FIG. 3A shows a document which is registered in this embodiment, FIG. 3B shows bibliographical information thereof, and FIG. 3C shows keywords thereof.

When a registering document 11 which is to be registered is entered, a keyword extraction part 10 extracts keywords from the registering document 11. The extracted keywords and the registering document 11 are supplied to a document information manager 20, a keyword connection table processor 30 and an inverted file generator 40.

The document information manager 20 stores registering document 11, and the keywords and the bibliographical information of the registering document 11 into a file 21 in a form of a database which is easily accessible when making the document retrieval. The file 21 corresponds to the document database 2 shown in FIG. 1.

The keyword connection table processor 30 generates keyword connection tables shown in FIGS. 5 through 8 by tabulating the necessary keywords and the keyword connections (relation information) and stores these keyword connection tables in a file 31. The file 31 corresponds to the keyword layer 3 shown in FIG. 1.

The contents of the file 31 are refined to the dynamic keyword connection as follows. That is, a keyword connection table shown in FIG. 5 having initial values before the document registration becomes a table shown in FIG. 6 which shows direct keyword connections after the document registration. Next, a table shown in FIG. 7 is obtained in which indirect keyword connections and relationships thereof are added. A table shown in FIG. 8 is finally obtained in which learning coefficients are added. As will be described later, when the final group of keywords includes "company R", "communication", "image" and "nerve cell" in FIG. 7, a learning coefficient "+5" is added to portions in FIG. 7 corresponding to lightly hatched portions and a learning coefficient "+10" is added to portions in FIG. 7 corresponding to darkly hatched portions in FIG. 8.

The initial values in the keyword connection table 5 shown in FIG. 5 are set to arbitrary values based on experience, for example. The probability that "company R" IS-A "enterprise" is high and the relationship value is initially set to "90". But "BTT" may be a company name or an abbreviation for something else. Therefore, the probability that "BTT" IS-A "enterprise" is less that the probability that "company R" IS-A "enterprise", and the relationship value is initially set to "50". But as will be described later, any inappropriate initial setting of the relationship values can be corrected by a learning function which will be described later in the present specification. In other words, there is no strict requirements on the initial setting of the relationship values.

The inverted file generator 40 generates an inverted file for making the keywords correspond to the registering document 11 and stores the generated inverted file in a file 41. The file 41 corresponds to the inverted file 4 shown in FIG. 1.

A document selector 50 is used for extracting a document text which is closest to the required subject and required concept of the user by use of a group of keywords. The document selector 50 displays a list of keywords on a display device 70 with respect to the user who makes an access from a keyboard 60. The user selects the keywords needed for the required subject out of the list of keywords or selects free keywords, and again enters a display retrieval request from the keyboard 60. The document selector 50 has a relevance of text calculation part (hereinafter simply referred to as a text relevance calculator) 51, a relationship and relevance of keyword calculation part (hereinafter simply referred to as keyword relationship/relevance calculator) 52, a sorter 53, a request processor 54, and a display controller 55.

First, the request processor 54 transfers keywords received from the keyboard 60 to the keyword relationship/relevance calculator 52 so as to select the keywords related to the received keyword out of the keyword connection table. For example, the keywords "company R" and "communication" are the received keywords transferred to the keyword relationship/relevance calculator 52.

The keyword relationship/relevance calculator 52 extracts from the keyword connection table shown in FIG. 6 the related keywords which are related to "company R" and "communication" and also the relationship values. In other words, the keyword connection table shown in FIG. 6 is looked up by use of the two keywords "company R" and "communication", and relation information such as ["company R", "BTT" (technical tie-up)], ["company R", "communication" (research and development)], ["company R", "nerve cell" (including same text)], ["company R", "enterprise" (IS-A)], ["company R", "image" (including same text)], ["communication", "nerve cell" (synonym)] and the like are obtained.

The keyword relationship/relevance calculator 52 calculates the value of the relationship between two arbitrary keywords from the relation name and relationship of a direct keyword connection existing in the keyword layer, and stores the calculated relationship value in the keyword connection table. When no direct relation exists between the two arbitrary keywords but one or more indirect relations exist between the two arbitrary keywords through one or more keywords, it is said in this case that an "indirect keyword connection" exists. The relationship value of the indirect keyword connection can be calculated based on the calculation formula used to calculate the value of the relationship between the two arbitrary keywords. It is said that the relationship value is "0" when no direct keyword connection nor indirect keyword connection exists between the two arbitrary keywords.

Next, a description will be given of an embodiment of a formula for calculating the relationship value of a keyword connection coupling two arbitrary keywords. A relationship $K_{REL}[K_p, K_q]$ of a keyword connection (p, q) between two arbitrary keywords $K_p$ and $K_q$ can be defined by use of a relation name $N_{ij}$ and a relationship value $S_{ij}$ of a keyword connection (i, j)$\in UC_{ALL}$ between keywords $K_i$ and $K_j$ existing in the keyword layer, where $UC_{ALL}$ denotes a set of keyword connections between the keywords $K_i$ and $K_j$ in the keyword layer and $K_p$, $K_q$, $K_i$ and $K_j$ respectively denote keywords p, q, i and j. The following formula (1) defines the relationship $K_{REL}[K_p, K_q]$ $$K_{REL}[K_p, K_q] = f[S_{ij}, N_{ij}, p, q] \quad (1)$$

The function $f[S_{ij}, N_{ij}, p, q]$ which determines the relationship $K_{REL}[K_p, K_q]$ can be obtained according to various methods, and an embodiment of such methods will be described hereunder.

CASE (I): When a direct keyword connection exists between the two keywords $K_p$ and $K_q$, the function $f[S_{ij}, N_{ij}, p, q]$ can be described by the following formula (2), where $AMP[N_{ij}]$ denotes a weighting coefficient and differs depending on the relation name.

$$f[S_{ij}, N_{ij}, p, q] = S_{ij} \times A_{MP}[N_{ij}] \quad (2)$$

For example, the weighting coefficient $A_{MP}[N_{ij}]$ can be implemented by $N_{ij}$ as follows.

(CASE $N_{ij}$ ("also known as" (SETQ $A_{MP}[N_{ij}]$ 1.0)) ("synonym" (SETQ $A_{MP}[N_{ij}]$ 0.8))

("antonym" (SETQ $A_{MP}[N_{ij}]$ −0.5)))

The above statement means that "1.0" is substituted into $A_{MP}[N_{ij}]$ when $N_{ij}$ is "also known as", "0.8" is substituted into $A_{MP}[N_{ij}]$ when $N_{ij}$ is "synonym", and "−0.5" is substituted into $A_{MP}[N_{ij}]$ when $N_{ij}$ is "antonym".

CASE (II): When no direct keyword connection exists between the two keywords $K_p$ and $K_q$ but one or more indirect keyword connections exist between the two keywords $K_p$ and $K_q$, the function $f[S_{ij}, N_{ij}, p, q]$ can be described by the following formula (3), where $C_1$ through $C_n$ denote numbers of indirect keyword connections, $UC_k$ denotes a set of direct keyword connections constituting indirect keyword connections $C_k$, $\Sigma$ denotes a sum total of the direct keyword connections (i, j) included in $UC_k$, and MIN denotes a minimum value of the relationship values of the n indirect keyword connections $C_1$ through $C_n$.

$$f[S_{ij}, N_{ij}, p, q] = \left( \underset{C_1 \sim C_n}{MIN} \underset{(i,j) \in UC_k}{\Sigma} (S_{ij} \times A_{MP}\{N_{ij}\})^{-1} \right)^{-1} \quad (3)$$

CASE (III): When no direct keyword connection exists between the two keywords $K_p$ and $K_q$ and no indirect keyword connection exists between the two keywords $K_p$ and $K_q$, the function $f[S_{ij}, N_{ij}, p, q]$ can be described the following formula (4).

$$f[S_{ij}, N_{ij}, p, q] = 0 \quad (4)$$

Figures 9, 10:
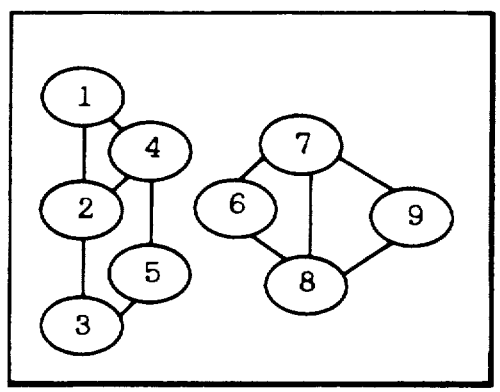
FIG. 9 shows an embodiment of a keyword layer having keyword connections.
FIG. 10 is a table showing the keyword connections in the keyword layer shown in FIG. 9 for three cases using different formulas for calculating relationship values.

The CASES (I), (II) and (III) are shown in FIG. 10 for the keyword layer having the keyword connections shown in FIG. 9. In FIG. 9, ①through ⑨respectively denote keywords. There are direct or indirect keyword connections within a group made up of the keywords ①through ⑤, and there are direct or indirect keyword connections within a group made up of the keywords ⑥through ⑨. But no direct nor indirect keyword connection exists between these two groups. In FIG. 10, $[K_p, K_q]$ is denoted by [p-q] for convenience' sake.

A description will now be given of the significance of the formulas (2) through (4) for calculating the relationship values of the keyword connection between two arbitrary keywords. The keyword layer is an implementation of a graph of the keyword connections having the relation information between the keywords in a form of an arrangement or table. The graph normally is not a complete graph. In other words, not all the keywords necessarily have a keyword connection to all of the remaining keywords. Accordingly, it is possible to consider making an imaginary complete graph having a keyword connection as a relationship between two arbitrary keywords. This is equivalent to calculating the relationship value of the keyword connection between the two arbitrary keywords having the indirect keyword connection, by use of the connection information existing in the keyword layer.

Therefore, when a direct keyword connection (p, q) exists between two arbitrary keywords $K_p$ and $K_q$, the relationship value of the direct keyword connection (p, q) can be obtained from the formula (2) by simply multiplying weighting coefficients to the relationship value $S_{ij}$, where the weighting coefficients are different depending on the relation name $N_{ij}$.

On the other hand, when a plurality of indirect keyword connections exist, the relationship values thereof are calculated from the formula (3) for each of the indirect keyword connections and an optimum value is obtained from the calculated values. The term $(S_{ij} \times A_{MP}\{N_{ij}\})^{-1}$ is an inverse number of the relationship value $K_{REL}[K_i, K_j]$ of a certain direct keyword connection (i, j) included in the set $UC_k$. An evaluation value of the indirect keyword connection $C_k$ between the keywords $K_p$ and $K_q$ is obtained by adding the term $(S_{ij} \times A_{MP}\{N_{ij}\})^{-1}$ for all of the direct keyword connections (i, j) $UC_k$. The dimension of the evaluation value is 1/(relationship value). The evaluation value is calculated for all of the n indirect connections $C_1$ through $C_n$, and an inverse number of a minimum value of the calculated evaluation values is obtained as the relationship value $K_{REL}[K_i, K_j]$ of the indirect keyword connection.

When the relation information shown in FIG. 6 are direct keyword connections and the weighting coefficient is assumed to be "1.0" for convenience' sake, the keyword connection table shown in FIG. 7 is obtained. The keyword connection table shown in FIG. 7 shows the indirect keyword connections and the relationship values thereof obtained from FIG. 6.

In FIG. 7, six indirect keyword connections are generated. These six indirect keyword connections correspond to the CASE (II) described before and are calculated from the formula (3). For example, the calculation steps for the indirect keyword connection between the keywords "enterprise" and "communication" are as follows.

In other words, the following are examples of the paths between the keywords "enterprise" and "communication".

(1) "enterprise"→"company R"→"communication"
(2) "enterprise"→"BTT"→"communication"
(3) "enterprise"→"company R"→"BTT"→"communication"
(4) "enterprise"→"company R"→"nerve cell"→"communication"
(5) "enterprise"→"BTT"→"company R"→"communication"

The relationship value of the indirect keyword connection becomes larger when a number of intervening keywords in the path between the two keywords "enterprise" and "communication" becomes smaller. Hence, it may be considered that the path (1) or (2) above is the minimum (MIN) of the inverse number of the formula (3). The calculated values for the two paths (1) and (2) become as follows. (1) "enterprise"$_{90}$"company R"$_{30}$"communication" Thus, $\Sigma(S_{ij} \times A_{MP}\{N_{ij}\})^{-1} = 1/90 + 1/30 = 4/90$ (2) "enterprise"$_{50}$"BTT"$_{40}$"communication" Thus, $\Sigma(S_{ij} \times A_{MP}\{N_{ij}\})^{-1} = 1/50 + 1/40 = 9/200$ Therefore, $$K_{REL}[\text{"enterprise"}, \text{"communication"}] =$$

$$(MIN\Sigma(S_{ij} \times A_{MP}\{N_{ij}\})^{-1})^{-1} = 90/4 = 22.5$$

In addition, the keyword relationship/relevance calculator 52 extracts the related keywords which are related to "company R" and "communication" and also the relationship values from the keyword connection table shown in FIG. 7, and calculates the relevance of the keywords. First, the two keywords "company R" and "communication" are used to look up the keyword connection table shown in FIG. 7 to extract nine relation information related to the two designated keywords. The nine relation information are ["company R", "BTT" (technical tie-up, 50)], ["company R", "communication" (research and development, 30)], ["company R", "nerve cell" (including same text, 80)], ["company R", "enterprise" (IS-A, 90)], ["company R", "image" (including same text, 80)], ["communication", "BTT" (research and development, 40)], ["communication", "nerve cell" (synonym, 20)], ["communication", "enterprise" (indirect, 22.5)], and ["communication", "image" (indirect, 21.8)]. An arbitrary relevance of keyword can be obtained by use of these relationships. In FIG. 7, the indirect relation information is indicated by a hatching.

Next, a description will be given of the method of calculating the relevance of keyword. A relevance KC of the keyword $K_p$ can be described by the following formula (5), where $K_{CLISTS}$ denotes a set of keyword groups for which the calculation of the relevance of keyword is to be made and $\Sigma$ denotes a sum total of $K_{REL}$ when the keywords included in $K_{CLISTS}$ are respectively substituted into $K_q$. This set $K_{CLISTS}$ is designated by the user.

$$KC[K_p, K_{CLISTS}] = \sum_{K_q \in K_{CLISTS}} K_{REL}[K_p, K_q] \quad (5)$$

In the case where $K_{CLISTS}$=("company R", "communication"), the relevance KC of the keyword "BTT" can be calculated as follows.

$$KC[BTT, (\text{"company R", "communication"})]$$
$$= \Sigma K_{REL}[K_p, K_q]$$
$$= K_{REL}[BTT, \text{company R}] + K_{REL}[BTT, \text{communication}]$$
$$= 50 + 40 = 90$$

Similarly, the relevance KC of the keywords "nerve cell", "enterprise" and "image" can be calculated to obtain KC[nerve cell, ("company R", "communication")]=100, KC[enterprise, ("company R", "communication")]=112.5, and KC[image, ("company R", "communication")]=101.8.

The sorter 53 sorts the group of the related keywords which are obtained from the keyword relationship/relevance calculator 52 in a sequence starting from the related keyword having the largest relationship value to the related keyword having the smallest relationship value. The sorted group of the related keywords is supplied to the table controller 55.

The table controller 55 supplies the group of the related keywords to the display device 70 for monitoring by the user.

In this manner, the user can reflect the required subject and concept in the group of keywords by the interactive operation between the user and the document retrieval system. The group of keywords are refined by repeating the interactive operation, and a final group of keywords is obtained. For example, the user selects the keywords such as "company R", "communication", "image" and "nerve cell" as the final group of keywords, and this final group of keywords is supplied to the request processor 54 together with the document selection request.

When the request processor 54 receives the document selection request, the request processor 54 transfers the group of keywords to the text relevance calculator 51. At the same time, the request processor 54 instructs the keyword connection processor 52 to add the relationship values related to the final group of keywords. In other words, the relationship values of all of the keyword connections related to the keywords which are included in the group of keywords obtained when the document selection request is received are added with the learning coefficient "+5", for example, so as to renew the keyword connection table. When the present keyword connection table is as shown in FIG. 7 and the designated group of keywords includes the four keywords "company R", "communication", "image" and "nerve cell", the keyword connection table shown in FIG. 8 is obtained by adding the learning coefficient "+5" to the relationship values of the keyword connections related to these four keywords. The learning coefficient "+5" is added when only one of the keywords at the ends of the keyword connection is designated, and the learning coefficient "+10" is added when both the keywords at the ends of the keyword connection are designated.

When the keyword connection table is renewed, a new keyword connection which did not exist before the document retrieval is also generated. The new keyword connection is given a relation name "access" and a predetermined initial value of "50", for example, as the relationship value.

The text relevance calculator 51 uses the received group of keywords and the keyword connection table shown in FIG. 7 to calculate the relevance of text for the registering document 11, and transfers the calculated result to the sorter 53. For example, the relevance of text may be calculated by obtaining a sum total of the relationship values between the selected keywords and the keywords stored in the file 21 and normalizing the sum total. When the selected keywords are "company R", "communication", "image" and "nerve cell", for example, the relevance of text is calculated from these four selected keywords and the registering document 11 shown in FIG. 3A as follows. That is, the four selected keywords are used to look up the keyword connection table shown in FIG. 7, and the relationship values "80" for ["company R", "nerve cell"], "80" for ["company R", "image"], "30" for ["communication", "company R"], "20" for ["communication", "nerve cell"], "80" for ["image", "company R"], "80" for ["image", "nerve cell"], "80" for ["nerve cell", "company R"] and "80" for ["nerve cell", "image"] are obtained. These relationship values are added to obtain the sum total "530" (=80+ 80+30+20+80+80+80+80). In addition, when the selected keywords such as "company R", "image" and "nerve cell" themselves are included in the group of keywords shown in FIG. 3C of the registering document 11, "100" is added to the relationship values of each of such three selected keywords. The sum total "530" added with "100×3" is normalized by being divided by four which is the number of selected keywords. Hence, the normalized value is "207.5" (=[530+(100×3)]/4). The relevance of text is calculated in this manner for all of the registered texts and sorted to be displayed on the display device 70.

Therefore, according to this embodiment shown in FIG. 2, the register document 11 obtained through the keyword extraction part 10 and bibliographical information 12 thereof are entered into the document information manager 20. In addition, the keyword extraction part 10 supplies the register document 11 and the keywords extracted therefrom to the keyword connection table processor 30 and to the inverted file generator 40. In the keyword connection table processor 30, new relation information is added to the keyword connection table based on the relation such as "including same text". For example, when the keyword connection table before the document registration is as shown in FIG. 5 and the document text shown in FIG. 3A is registered, the keyword connection table becomes as shown in FIG. 6. In FIG. 6, three new connections are added. These three new connections are ["company R", "nerve cell" (including same text, 80)], ["company R", "image" (including same text, 80)] and ["nerve cell", "image" (including same text, 80)]. On the other hand, in the inverted file generator 40, the corresponding relations between the new keywords and the registered document texts are added to the inverted file.

In the document selection part 50, the request processor 54 first receives the display and retrieval requests from the user. In the case of the keyword display request, the results obtained from the keyword relationship/relevance calculator 52 are sorted in the sorter 53 and the display controller 55 displays a list of keywords on the display device 70. On the other hand, in the case of the text display request, the results obtained from the text relevance calculator 51 are sorted in the sorter 53 and the display controller 55 displays a list of texts on the display device 70. First, when the user designates a number of keywords, a list of keywords having a strong relation to the designated keywords is displayed on the display device 70. For this reason, the user can again select keywords from the displayed list. By repeating such an operation of selecting the keywords, the user can gradually refine the group of keywords appropriate for the document which is to be retrieved.

The operation of the document selection part 50 shown in FIG. 2 may be carried out by a computer, and a description will now be given of the operations of such a computer.

Figure 11:
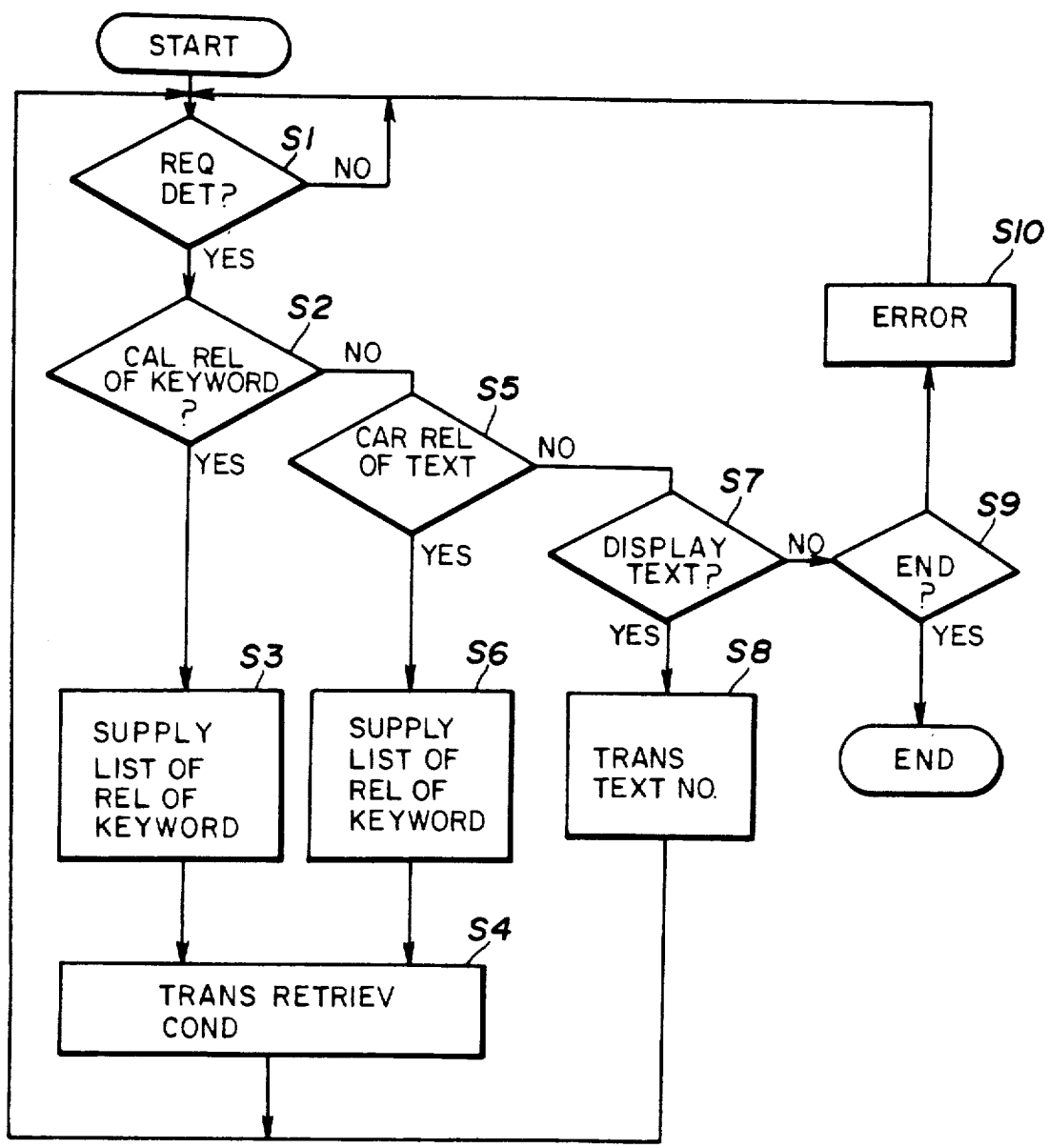
FIG. 11 is a flow chart showing an embodiment of an operation of a computer for carrying out functions of a request processor shown in FIG. 2.

FIG. 11 shows an embodiment of an operation of a computer for carrying out the functions of the request processor 54 shown in FIG. 2. In FIG. 11, a step S1 discriminates whether or not a request is entered from the keyboard 60. When the discrimination result in the step S1 becomes YES, a step S2 discriminates whether or not the request is a request for calculating the relevance of keyword. When the discrimination result in the step S2 is YES, a step S3 instructs the keyword relationship/relevance calculator 52 to supply a list of the relevance of keywords to the sorter 53. Then a step S4 transfers to the keyword relationship/relevance calculator 52 the retrieval conditions such as the keywords.

On the other hand, when the discrimination result in the step S2 is NO, a step S5 discriminates whether or not the request is a request for calculating the relevance of text. When the discrimination result in the step S5 is YES, a step S6 instructs the keyword relationship/relevance calculator 52 to supply the list of the relevance of keywords to the text relevance calculator 51, and the process advances to the step S4.

When the discrimination result in the step S5 is NO, a step S7 discriminates whether or not the request is a request for displaying the content of the document text. A step S8 transfers the document number to the display controller 55 when the discrimination result in the step S7 is YES. On the other hand, when the discrimination result in the step S7 is NO, a step S9 discriminates whether or not the request is an end request. The process is ended when the discrimination result in the step S9 is YES, but a step S10 supplies a message to the display controller 55 to display a request error on the display device 70 when the discrimination result in the step S9 is NO.

Figure 12:
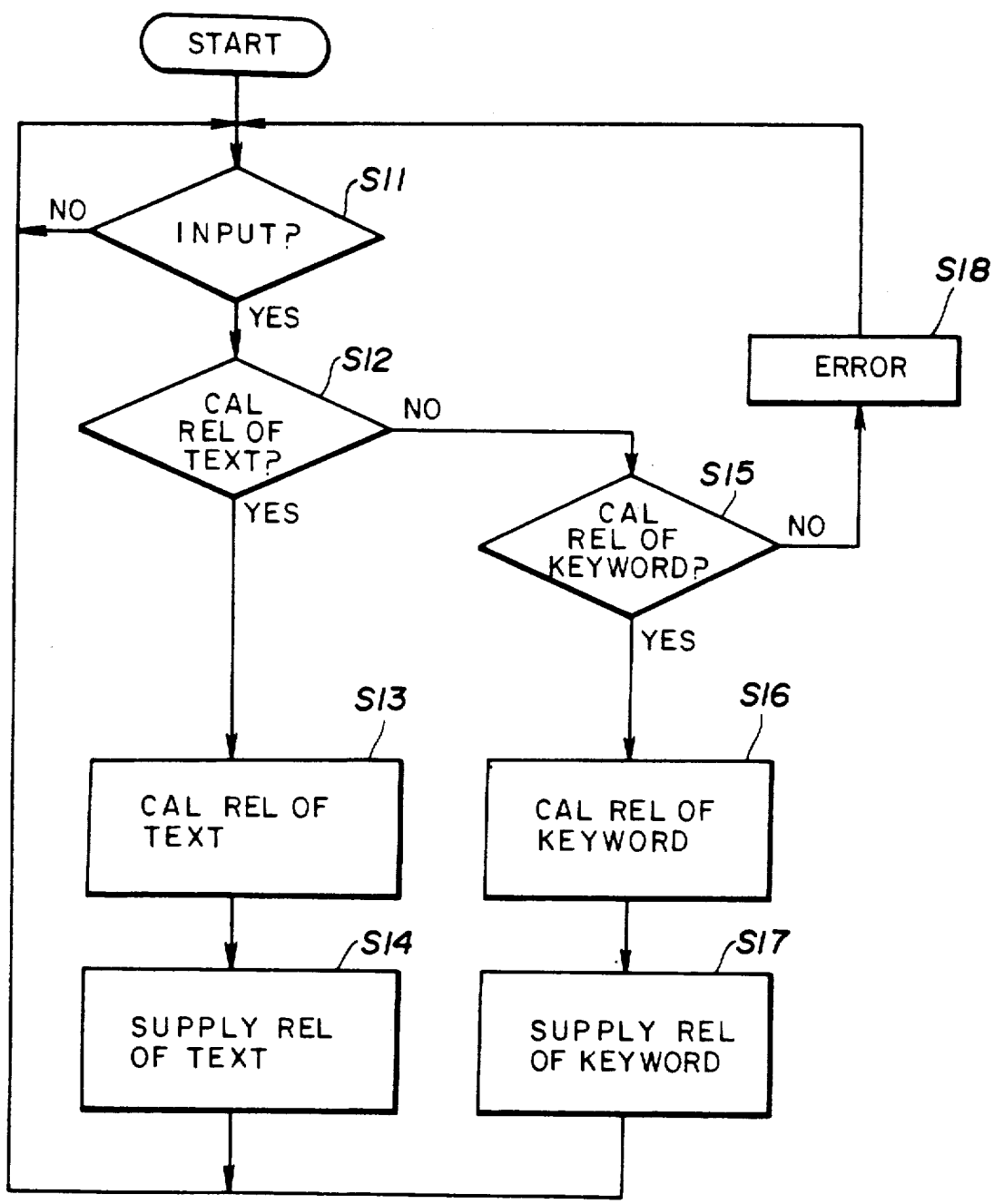
FIG. 12 is a flow chart showing an embodiment of an operation of a computer for carrying out functions of a keyword relationship/relevance calculator shown in FIG. 2.

FIG. 12 shows an embodiment of an operation of a computer for carrying out the functions of the keyword relationship/relevance calculator 52 shown in FIG. 2. In FIG. 12, a step S11 discriminates whether or not an input is detected from the request processor 54. When the discrimination result in the step S11 becomes YES, a step S12 discriminates whether or not the detected input is the request for calculating the relevance of text. And when the discrimination result in the step S12 is YES, a step S13 calculates the relevance of text for all of the keywords based on the keyword connection table and the retrieval conditions including the keywords. Then, a step S14 supplies the relevance of text for all of the keywords to the sorter 53.

But when the discrimination result in the step S12 is NO, a step S15 discriminates whether or not the detected input is the request for calculating the relevance of keyword. And when the discrimination result in the step S15 is YES, a step S16 calculates the relevance of keyword for all of the keywords based on the keyword connection table and the retrieval conditions including the keywords. Then, a step S17 supplies the relevance of keyword for all of the keywords to the text relevance calculator 51.

When the discrimination result in the step S15 is NO, a step S18 supplies a message to the display controller 55 to display a request error on the display device 70.

Figure 13:
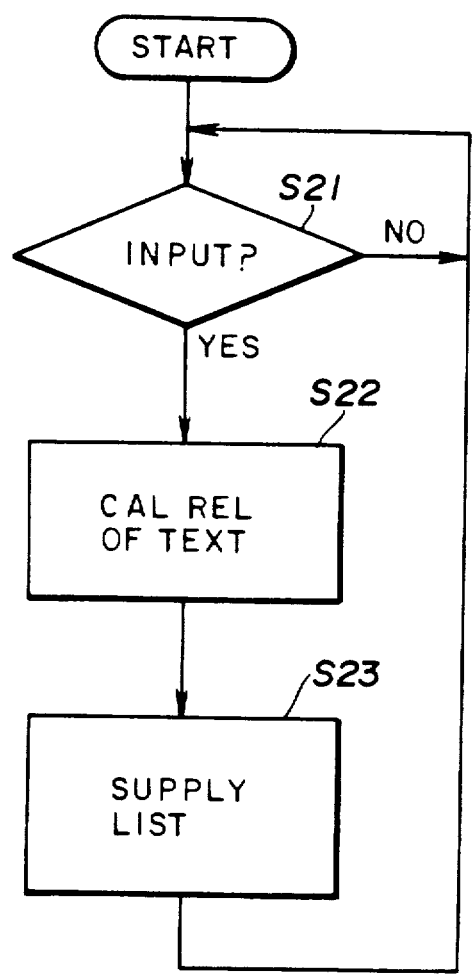
FIG. 13 is a flow chart showing an embodiment of an operation of a computer for carrying out functions of a text relevance calculator shown in FIG. 2.

FIG. 13 shows an embodiment of an operation of a computer for carrying out the functions of the text relevance calculator 51 shown in FIG. 2. In FIG. 13, a step S21 discriminates whether or not an input is detected from the keyword relationship/relevance calculator 52. When the discrimination result in the step S21 becomes YES, a step S22 calculates the relevance of text for each of the registered document texts based on the list of relevance of keywords and the inverted file read out from the file 41. In addition, a step S23 supplies a list of sets of the document text names and relevance of texts to the sorter 53 so that this list is supplied from the sorter 53 to the display controller 55 as a list of relevance of texts sorted in the sequence dependent on the size of the relevance of texts.

Figure 14:
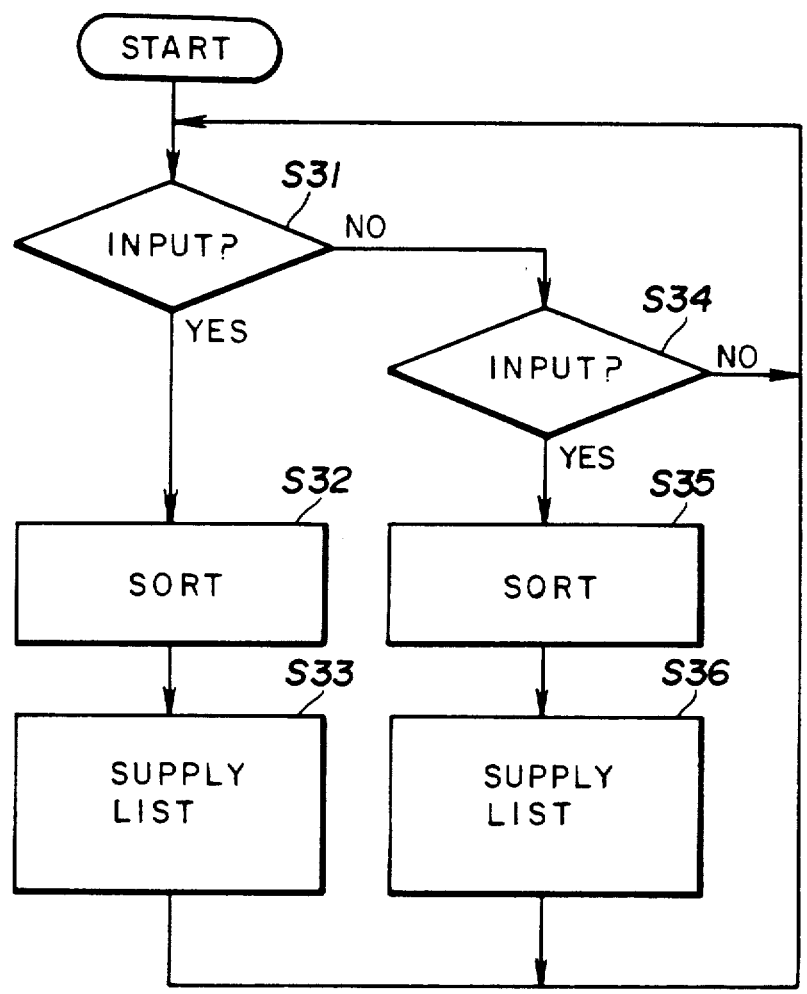
FIG. 14 is a flow chart showing an embodiment of an operation of a computer for carrying out functions of a sorter shown in FIG. 2.

FIG. 14 shows an embodiment of an operation of a computer for carrying out the functions of the sorter 53 shown in FIG. 2. In FIG. 14, a step S31 discriminates whether or not an input is detected from the keyword relationship/relevance calculator 52. When the discrimination result in the step S31 is YES, a step S32 sorts the keywords in a sequence dependent on the size of the relevance of keywords to form a list of the keywords arranged in the sequence of the relevance of keywords. Then, a step S33 supplies this list to the display controller 55.

On the other hand, when the discrimination result in the step S31 is NO, a step S34 discriminates whether or not an input is detected from the text relevance calculator 51. When the discrimination result in the step S34 becomes YES, a step S35 sorts the document texts in a sequence dependent on the size of the relevance of texts to form a list of the document texts arranged in the sequence of the relevance of texts. Then, a step S36 supplies this list to the display controller 55.

Figure 15:
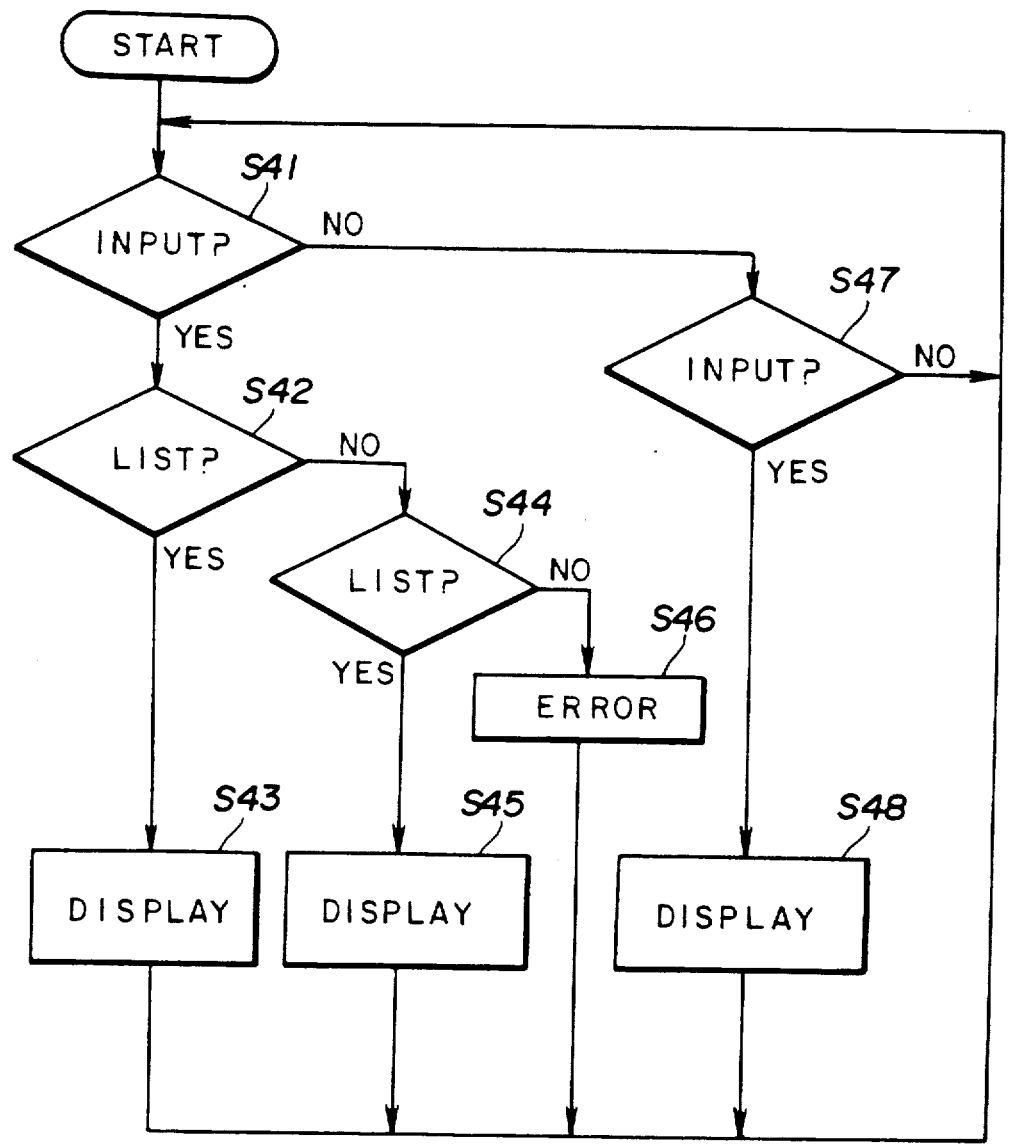
FIG. 15 is a flow chart showing an embodiment of an operation of a computer for carrying out functions of a display controller shown in FIG. 2.

FIG. 15 shows an embodiment of an operation of a computer for carrying out the functions of the display controller 55 shown in FIG. 2. In FIG. 15, a step S41 discriminates whether or not an input is detected from the sorter 53. When the discrimination result in the step S41 is YES, a step S42 discriminates whether or not the detected input is the list of the keywords arranged in the sequence of the relevance of keywords. A step S43 displays the relevance of keywords and the keyword names on the display device 70 when the discrimination result in the step S42 is YES.

On the other hand, when the discrimination result in the step S42 is NO, a step S44 discriminates whether or not the detected input is the list of the document texts arranged in the sequence of the relevance of texts. A step S45 displays the relevance of texts and the document text names on the display device 70 when the discrimination result in the step S44 is YES.

A step S46 displays an error message on the display device 70 when the discrimination result in the step S44 is NO. When the discrimination result in the step S41 is NO, a step S47 discriminates whether or not an input is detected from the request processor 54. When the discrimination result in the step S47 becomes YES, a step S48 displays on the display device 70 the content of the document text corresponding to the document number received from the request processor 54.

Next, a more detailed description will be given of the dynamic keyword connection which constitutes an essential part of the present invention. A network model having the dynamic keyword connection is a non-directed graph in which keywords are taken as nodes Key1 through Key4 as shown in FIG. 16 and the relation information between the keywords are taken as arcs A12, A13, A14, A23 and A34 which couple the nodes Key1 through Key4. The relation information includes the relation name and the relationship value. The network itself has a learning function due to a self-control of the relation information which occurs dependently on external stimulations.

The relationship value indicates the amplitude of the relation, and this relationship value changes depending on the access frequency of the keywords (nodes) coupled by the keyword connections (arcs). FIG. 17 shows the transition of the network before and after the document registration.

The user designates the keyword when making the document retrieval. The document retrieval system is a kind of a database management system which makes access to and displays the keyword and simultaneously adds a constant learning coefficient to the relationship value of the keyword connection which is coupled to the keyword. This constant learning coefficient added to the keyword connection may be data-relation dependent so as to add different values depending on the relation name. It is of course possible to designate a plurality of keywords, and similar processings are carried out for all of the keyword connections coupled to the keyword to which the access is made.

When the relationship value exceeds a preset maximum value, the relationship values of all of the keyword connections are normalized. This may be achieved by simply subtracting a constant value from the relationship values, for example. Accordingly, an average value of the relationship values of the keyword connections which are coupled to the keywords to which the access is made frequently gradually increases, while the average value of the relationship values of the keyword connections which are coupled to the keywords to which the access is hardly made gradually decreases.

When making the document retrieval, it is possible to make a fuzzy reference by use of a keyword which is coupled to the keyword designated by the user by an indirect keyword connection having a relationship value greater than a predetermined value.

The document retrieval system can make a garbage collection of the keywords when needed, to delete the keywords which are not used or seldom used so as to reduce the required memory capacity for the keywords. When making the garbage collection, it is possible to delete those keywords which have keyword connections with such relationship values that a sum total of the relationship values, a maximum value of the relationship values or an average value of the relationship values is less than a predetermined value. Such a garbage collection can be carried out by the cooperation of the sorter 53 and the display controller 55 responsive to a garbage collection request processed in the request processor 54.

A plurality of keywords can be clusterized when the relations of these keywords are "also known as" and/or "synonym", the relationship values are extremely large and the keyword connections form a complete graph. A cluster made up of the clusterized keywords may be given a cluster name. The use of such clusters makes the management of the keywords efficient because the inside of each cluster can be described relationally in a form of a list. FIG. 18 shows an embodiment of the clusterized keywords. A cluster 100 is made up of keywords 101 through 105 which are coupled by keyword connections C. A keyword connection CX may be coupled to a keyword (not shown) to couple the cluster 100 to this keyword, or the keyword connection CX may be coupled to another cluster (not shown) to couple the cluster 100 to this other cluster.

The garbage collection and the clusterization are powerful tools in preventing an explosive increase in combinations of the keywords.

The document text names including the keywords may be prepared in advance in a form of a list. The need of an adaptive inverted file may be determined by the size of a sum total of the relationship values of the keyword connections coupled to the keywords. The adaptive inverted file may be generated utilizing a free time available after the user enters a new text, by running a retrieval routine in parallel with a main program.

Next, a description will be given of an automatic indexing support algorithm and a document registration algorithm. First, a reference is made within a text 123 shown in FIG. 17 which is to be registered, and keywords Ⓒ, Ⓖ and Ⓓ which are used are extracted from the group of keywords included in the present keyword layer. Then, the user checks the extracted keywords Ⓒ, Ⓖ and Ⓓ and enters a new keyword Ⓓ to be additionally registered when the user judges that the new keyword Ⓓ is required. In this case, the user need not designate the classification (indexing) of the new keyword Ⓓ and it is simply sufficient to enter the new keyword Ⓓ. On the other hand, it is of course possible to automatically display the extracted keywords Ⓒ, Ⓖ and Ⓓ and let the user designate the relation of the new keyword Ⓓ with respect to the displayed keywords Ⓒ and Ⓖ. The document retrieval system judges that the new keyword Ⓓ is related to the extracted keywords Ⓒ, Ⓖ and Ⓓ, and places the new keyword Ⓓ in a vicinity of the extracted keywords Ⓒ, Ⓖ and Ⓓ which are related thereto as shown in FIG. 17. Thereafter, new keyword connections are formed between the new keyword Ⓓ and the extracted keywords Ⓒ, Ⓖ and Ⓓ which are related thereto.

It is desirable that the keyword connection is highly dependent on the document text because the reference to the document text is made based on the keywords. According to the dynamic keyword connection method employed in the present invention, the classification (indexing) of the keywords is not unique and changes dynamically since it is dependent on the registered document text. In addition, it is possible to form a keyword connection which is close to the vocabulary or image of the user and the user can hence select an appropriate keyword interactively because the document retrieval system has the learning function and the keyword layer learns by itself. Furthermore, it is possible to completely eliminate the dependency of the document retrieval system on the operator who initially registers the keywords, and there is no need to designate the classification (indexing) of the keywords. Therefore, the present invention provides a user-friendly document retrieval system.

By providing a threshold value with respect to the relevance of keywords, it is possible to use for the document retrieval the keywords which have a relevance of keywords greater than the threshold value. In addition, the registration and retrieval of the document according to the present invention is more flexible and easier compared to the conventional systems such as the thesaurus type document retrieval system having the fixed keyword classification (indexing). This means that the processing of the synonyms, fuzzy processing and the like can be carried out at a high speed according to the present invention.

In the described embodiment, the retrieved document text is displayed on the display device 70. But the means of outputting the retrieved document text is not limited to the display device 70, and it is possible to output the retrieved document text to a printer or to both a printer and a display device.

In addition, when retrieving the registered documents from the document database, one or a plurality of registered documents may satisfy the retrieval conditions entered by the user. But in the described embodiment, it is assumed for convenience' sake that one registered document satisfies the retrieval conditions.

Further, the present invention is not limited to these embodiments, but various variations and modifications may be made without departing from the scope of the present invention.

What is claimed is:

1. A document retrieval system for retrieving one or more registered documents from a document database responsive to designated retrieval conditions including one or more designated keywords, said document retrieval system comprising:
    (a) inverted file generating means supplied with the documents and keywords for generating an inverted file which indicates a relation between the keywords and each of the documents;
    (b) table generating means supplied with the keywords for generating a keyword connection table containing keyword connections which describe relations between two arbitrary keywords in said inverted file, said keyword connection table containing relation information, the relation information including at least (1) a relation name and (2) a value of a relationship of the keyword connections, the value of the relationship indicating an amplitude of the relations between the two arbitrary keywords, the amplitudes of the relations between the two arbitrary keywords being dependent on whether the two arbitrary keywords are (1) directly coupled by a direct keyword connection or (2) are coupled indirectly by an indirect keyword connection through one or more keywords other than said two arbitrary keywords, the values of the relationships contained in said keyword connection table dynamically changing depending on (1) the direct keyword connection each time a document is registered in a storage means and (2) the indirect keyword connection;
    (c) said storage means, said storage means for storing said inverted file, said keyword connection table, the keywords and the documents as registered documents, in a form of the document database;
    (d) designating means for designating retrieval conditions including one or more designated keywords, said retrieval conditions determining one or more of said registered documents to be retrieved from said storage means;
    (e) selecting means for looking up said keyword connection table by use of one or more of designated keywords and referring to said inverted file so as to select said one or more registered documents which satisfy said retrieval conditions, said selecting means including:
        (1) a request processor for processing requests including a document retrieval request from said designating means;
        (2) a first calculation part coupled to said storage means for calculating a relevance of keywords which indicate the amplitude of a relation between (1) a group of designated keywords from said designating means and (2) each of the keywords registered in said storage means, in response to the document retrieval request processed by said request processor;
        (3) a second calculation part coupled to said storage means for calculating a relevance of text which indicates the amplitude of a relation between (1) the group of designated keywords from said designating means and (2) each of the documents registered in said storage means, in response to the document retrieval request processed in said request processor, said second calculation part calculating the relevance of text by (1) obtaining a sum of the values of the keyword connections between (i) the designated keywords and (ii) the keywords registered in said storage means, and (2) normalizing said sum; and
        (4) a display controller, coupled to said first and second calculation parts, for providing information including the registered documents from said storage means to an output means, depending on calculation results obtained in said first and second calculation parts; and
    (f) said output means, said output means coupled to said selecting means for outputting said one or more registered documents selected by said selecting means.

2. The document retrieval system as claimed in claim 1, wherein the table generation means includes means for dynamically changing the relation information contained in said keyword connection table from initial values depending on a frequency of use of the keywords.

3. The document retrieval system as claimed in claim 1 further comprising:
    a sorter for sorting the calculation results which are supplied to said display controller from said first and second calculation parts, said sorter sorting the calculation results in a sequence dependent on values of the relationships between the designated keywords and the keywords registered in said storage means.

4. The document system as claimed in claim 3 wherein said sorter and said controller include means to cooperate, responsive to a garbage collection request processed in said request processor, to cause a garbage collection function, said garbage collection function including:
   deleting from said storage means those keywords which have keyword connections such that (1) a sum of the values of the relationships with other keywords, (2) a maximum value of the values of the relationships with other keywords or (3) an average value of the values of the relationships with other keywords, is less than a predetermined threshold value.

5. The document retrieval system as claimed in claim 1 wherein:
   said output means includes a display device.

6. The document retrieval system as claimed in claim 1 wherein the table generating means includes means for clusterizing a plurality of keywords and forming the keyword connections into a complete graph.

7. A document retrieval system for retrieving one or more registered documents from a document database responsive to designated retrieval conditions including one or more designated keywords, said document retrieval system comprising:
   (a) inverted file generating means supplied with the documents and keywords for generating an inverted file which indicates a relation between the keywords and each of the documents;
   (b) table generating means supplied with the keywords for generating a keyword connection table containing keyword connections which describe relations between two arbitrary keywords in said inverted file, said keyword connection table containing relation information, the relation information including at least (1) a relation name and (2) a value of a relationship of the keyword connections, the value of the relationship indicating an amplitude of the relations between the two arbitrary keywords, the amplitudes of the relations between the two arbitrary keywords being dependent on whether the two arbitrary keywords are (1) directly coupled by a direct keyword connection or (2) are coupled indirectly by an indirect keyword connection through one or more keywords other than said two arbitrary keywords, the values of the relationships contained in said keyword connection table dynamically changing depending on (1) the direct keyword connection each time a document is registered in a storage means and (2) the indirect keyword connection;
   (c) said storage means, said storage means for storing said inverted file, said keyword connection table, the keywords and the documents as registered documents, in a form of the document database;
   (d) designating means for designating retrieval conditions including one or more designated keywords, said retrieval conditions determining one or more of said registered documents to be retrieved from said storage means;
   (e) selecting means for looking up said keyword connection table by use of one or more of designated keywords and referring to said inverted file so as to select said one or more registered documents which satisfy said retrieval conditions, said selecting means including:
      (1) a request processor for processing request including a document retrieval request from said designating means;
      (2) a first calculation part coupled to said storage means for calculating a relevance of keywords which indicate the amplitude of a relation between (1) a group of designated keywords from said designating means and (2) each of the keywords registered in said storage means, in response to the document retrieval request processed by said request processor;
      (3) a second calculation part coupled to said storage means for calculating a relevance of text which indicates the amplitude of a relation between (1) the group of designated keywords from said designating means and (2) each of the documents registered in said storage means, in response to the document retrieval request processed in said request processor, said second calculation part calculating the relevance of text by (1) obtaining a sum of the values of the keyword connections between (i) the designated keywords and (ii) the keywords registered in said storage means, and (2) normalizing said sum; and
      (4) a display controller, coupled to said first and second calculation parts, for providing information including the registered documents from said storage means to an output means, depending on calculation results obtained in said first and second calculation parts; and
   (f) said output means, said output means coupled to said selecting means for outputting said one or more registered documents selected by said selecting means;
wherein:
   (A) the amplitude of the relation between the two arbitrary keywords is dependent on whether:
      (1) the two arbitrary keywords are directly coupled by a direct keyword connection or
      (2) coupled indirectly by an indirect keyword connection through one or a plurality of keywords other than said two arbitrary keywords;
   (B) the value of a relationship $K_{REL}[K_p, K_q]$ of a keyword connection (p, q) between two arbitrary keywords $K_p$ and $K_q$ is defined as $$K_{REL}[K_p, K_q] = f[S_{ij}, N_{ij}, p, q]$$

by use of a relation name $N_{ij}$ and a relationship value $S_{ij}$ of a keyword connection (i, j) $\in UC_{ALL}$ between keywords $K_i$ and $K_j$ existing in a keyword layer; wherein:
      (1) $UC_{ALL}$ denotes a set of keyword connections between the keywords $K_i$ and $K_j$ in the keyword layer; and
      (2) $K_p$, $K_q$, $K_i$ and $K_j$ respectively denote keywords p, q, i and j;
   (C) the function $f[S_{ij}, N_{ij}, p, q]$ is equal to $S_{ij} \times A_{MP}[N_{ij}]$ when a direct keyword connection exists between the two keywords $K_p$ and $K_q$, where $A_{MP}[N_{ij}]$ denotes a weighting coefficient which varies depending on the relation name; and
   (D) the function $f[S_{ij}, N_{ij}, p, q]$ is equal to $$\left( \operatorname*{MIN}_{C_1 \sim C_n} \sum_{(i,j) \in UC_k} (S_{ij} \times A_{MP}[N_{ij}])^{-1} \right)^{-1}$$

when no direct keyword connection exists between the two keywords $K_p$ and $K_q$ but one or more indirect keyword connections exist between the two keywords $K_p$ and $K_q$, wherein:
  (1) $C_1$ through $C_n$ denote numbers of indirect keyword connections;
  (2) $UC_k$ denotes a set of direct keyword connections constituting indirect keyword connections $C_k$;
  (3) $\Sigma$ denotes a sum total of the direct keyword connections (i, j) included in $UC_k$; and
  (4) MIN denotes a minimum value of the relationship values of the n indirect keyword connections $C_1$ through $C_n$.

8. The document retrieval system as claimed in claim 7, wherein:
  the function $f[S_{ij}, N_{ij}, p, q]=0$ when no direct keyword connection exists between the two keywords $K_p$ and $K_q$ and no indirect keyword connection exists between the two keywords $K_p$ and $K_q$.

9. The document retrieval system as claimed in claim 7, wherein:
  (a) values of the relationships between two arbitrary keywords contained in said keyword connection table further dynamically change, depending on a frequency of use of the keywords in the calculation of the relevance of text;
  (b) a learning coefficient is added to the value of the relationship between two arbitrary keywords depending on the frequency of use of the keywords;
  (c) the relation information contained in said keyword connection table is renewed every time the registered document is retrieved, the renewing of said keyword connection table including an addition of new relation information of a new keyword connection; and
  (d) said table generating means generates a keyword connection table which contains relation information including at least (1) a relation name and (2) a value of a relationship of the keyword connection, the value of the relationship of the keyword connection indicating an amplitude of the relation between the two arbitrary keywords, said table generating means assigning (1) a predetermined relation name to the relation name and (2) a predetermined value to the relationship of said keyword connection.

* * * * *